UNITED STATES PATENT OFFICE.

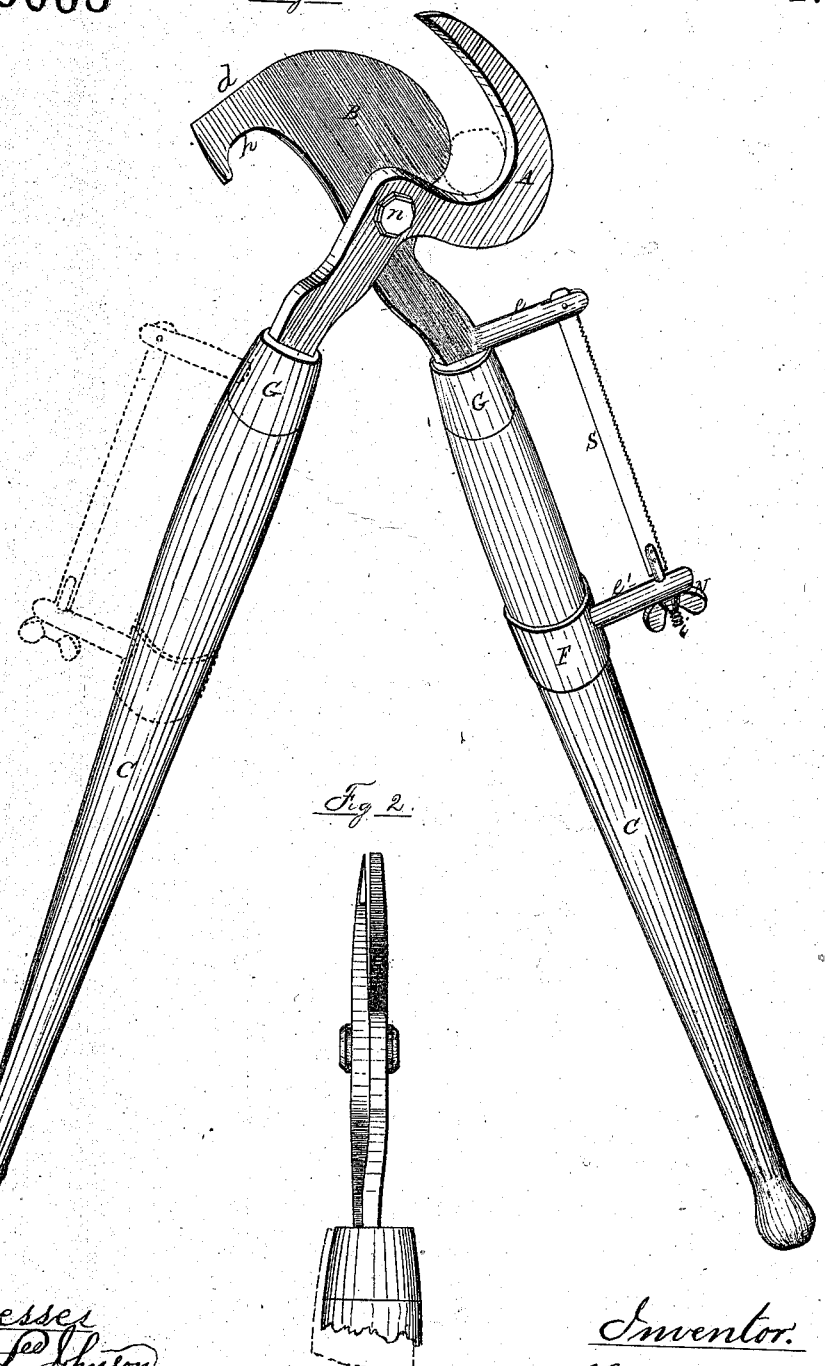

GEORGE W. ANESLEY, OF MARENGO TOWNSHIP, MICHIGAN.

IMPROVEMENT IN PRUNING-TOOL.

Specification forming part of Letters Patent No. 103,005, dated May 17, 1870.

I, GEORGE W. ANESLEY, of the township of Marengo, in the county of Calhoun and State of Michigan, have invented certain Improvements in Pruning-Tools, of which the following is a specification:

The first part of my invention relates to improvements in the conformation and set of the shear hook and blade, so that, while making a heavy drawing cut, the acute cutting-edge may not override the more obtuse edge of the hook, and also in extending the cutting-blade past the hook, to act as a chisel in paring off small shoots.

The second part of my invention relates to providing one of the handles with a strained saw-blade, which may be removable both from or with the handle, the object being to saw off the limbs of trees too large to be sheared off, all as shown in the annexed drawings, in which—

Figure 1 is a perspective view. Fig. 2 is an edge view of the blades.

A is the hook, and B is the cutting shear-blade, each provided with a tang inserted into a long handle, C. The hook and blade are pivoted together at a point as close as practicable to the base of the cutting-edges, as at $n$, the concave edge of the hook being ground to rather less than a right angle, with its cutting-face and the convex edge of the shear-blade to a sufficiently thin cutting-edge. The hook and cutting-edge of the shear-blade B should be formed with a bold deep curve toward the base, substantially as shown, for the purpose of clasping a good-sized limb close to the fulcrum-pivot by a moderate extension of the handles, and also to make a clean drawing cut without having the limb slipped forward in the act of cutting.

I construct my shear cutting-blade so as to extend the cutting-edge, as at $d$, beyond the scope of the shear-cut, that it may do duty as a chisel in trimming off small shoots, and shape the opposite edge of such extension like a blunt hook, as shown at $h$, to rake down lodged limbs or shoots, or to hang up the shears by while using the pruning-saw, which attachment I will now proceed to describe.

$s$ is the saw-blade, and $e$ is a slit-stud, in which the forward end of the saw is hung, in the ordinary way, by a pin or screw. The hinder end is secured in a similar manner in a screw-clip, $i$, passing through the stud $e'$, and carrying a thumb-nut, N, for straining the saw. The stud $e'$ is secured to a ferrule, F, slipped on the taper handle of the shears, so as to wedge fast at the proper point.

There are two points or parts to which the forward saw-stud $e$ may be attached. One is to weld it to the shears tang, as shown at the right in the drawing, and the other is to weld it to the ferrule G of the handle, as shown in dotted lines at the left. In this latter case, the tang would have to be so fitted that the handle would be detachable at pleasure.

When, therefore, it became necessary to use the saw, the handle could, with the saw on it, be detached from the tang, the shears hung by its blunt hook to the tree, and, when the sawing-off process was completed, the handle could be restored to its place without the operator having to change his position in the tree.

I will say here that, with shears having such a conformation as mine, it is necessary to so set the cutting-blade and hook that, when they are pivoted and shut together, there will be a small diverging space between them from the base to the point, as shown in Fig. 2, and this, in connection with the somewhat obtuse-angled edge of the hook, neutralizes the tendency to overlap in making heavy drawing cuts. Also, to enable the shears to prune as close as is often desirable, the outer corner of the hook should be chamfered, so as to bring the face of the hook more in range with the beveled face of the cutting-blade B.

My improvements, as herein described, adapt this implement for every variety of pruning-work in orchard, garden, or field.

I am well aware that a curved cutting-blade acting in connection with a conformable-shaped hook, to produce what is known as a drawing cut, is an old pruning device, and that a mere difference in degree, although an improvement, might not be deemed a patentable one; but I am not aware that the devices herein described, by the use of which the operator is enabled to apply the utmost leverage power without bringing the cutting-edges into destructive contact, and by which an additional use is given to the cutting-blade by its chisel extension, has ever before been embodied in pruning-shears as in mine.

I claim as my invention—

1. In combination with a pruning-shears, the pruning-saw s and attachments, constructed as described, and connected with one of the handles C, so as to be removable with it for use when the said handle is made detachable, substantially as and for the purpose set forth.

2. The blade B, made with the chisel-edge d, forming a continuation of the shear-edge, and hook h, and the hook A, which has an obtuse cutting-edge, when said blade and hook are so attached to each other that the cutting portions will diverge, as shown in Fig. 2, as and for the purpose set forth.

3. The improved pruning-tool herein described, composed of the blade B, chisel d, and hook h, secured to the obtuse-edged hook A so as to diverge therefrom, the strained saw s and attachments, and the handles C C, the handle to which the saw is secured being detachable therewith, as herein set forth.

GEORGE W. ANESLEY.

Witnesses:
OTTO L. JOHNSON,
ALBERT PATCH.